United States Patent
Vaajala (10) Patent No.: US 8,086,885 B2
(45) Date of Patent: Dec. 27, 2011

(54) RUNTIME CONTROL OF SYSTEM PERFORMANCE

(75) Inventor: Kristian Vaajala, Lieto (FI)

(73) Assignee: Nokia Corporation, Espoo (FI)

( * ) Notice: Subject to any disclaimer, the term of this patent is extended or adjusted under 35 U.S.C. 154(b) by 673 days.

(21) Appl. No.: 12/002,015

(22) Filed: Dec. 14, 2007

(65) Prior Publication Data

US 2009/0158060 A1    Jun. 18, 2009

(51) Int. Cl.
*G06F 1/00* (2006.01)

(52) U.S. Cl. ........................................ 713/322

(58) Field of Classification Search ........... 713/300–340
See application file for complete search history.

(56) References Cited

U.S. PATENT DOCUMENTS

| | | | | |
|---|---|---|---|---|
| 5,423,045 A * | 6/1995 | Kannan et al. | 713/322 |
| 5,560,024 A * | 9/1996 | Harper et al. | 713/322 |
| 5,666,540 A * | 9/1997 | Hagiwara et al. | 713/323 |
| 5,742,833 A * | 4/1998 | Dea et al. | 713/323 |
| 5,768,602 A * | 6/1998 | Dhuey | 713/322 |
| 5,903,601 A * | 5/1999 | Elnashar et al. | 375/220 |
| 6,049,885 A * | 4/2000 | Gibson et al. | 713/324 |
| 6,085,330 A * | 7/2000 | Hewitt et al. | 713/322 |
| 6,115,823 A * | 9/2000 | Velasco et al. | 713/322 |
| 6,378,076 B1 * | 4/2002 | Qureshi | 713/322 |
| 6,665,802 B1 * | 12/2003 | Ober | 713/320 |
| 6,711,691 B1 * | 3/2004 | Howard et al. | 713/300 |
| 6,823,516 B1 | 11/2004 | Cooper | 718/108 |
| 6,848,057 B2 * | 1/2005 | Hicok | 713/320 |
| 6,904,535 B2 * | 6/2005 | Yamada et al. | 713/324 |
| 7,076,672 B2 * | 7/2006 | Naveh et al. | 713/300 |
| 7,080,267 B2 * | 7/2006 | Gary et al. | 713/300 |
| 7,155,617 B2 * | 12/2006 | Gary et al. | 713/300 |
| 7,228,441 B2 * | 6/2007 | Fung | 713/300 |
| 7,231,530 B1 * | 6/2007 | Miller et al. | 713/320 |
| 7,243,249 B1 * | 7/2007 | Dunstan et al. | 713/310 |
| 7,276,925 B2 * | 10/2007 | Dobberpuhl et al. | 324/763 |
| 7,284,137 B2 * | 10/2007 | Clark et al. | 713/300 |
| 7,325,148 B2 * | 1/2008 | Inoue et al. | 713/300 |
| 7,461,272 B2 * | 12/2008 | Rotem et al. | 713/300 |
| 7,472,298 B1 * | 12/2008 | Kimmel et al. | 713/320 |
| 7,502,948 B2 * | 3/2009 | Rotem et al. | 713/300 |
| 7,581,120 B1 * | 8/2009 | Hartman et al. | 713/300 |
| 7,590,509 B2 * | 9/2009 | Riedlinger et al. | 702/182 |

(Continued)

FOREIGN PATENT DOCUMENTS

WO    WO-2005/050425 A1    6/2005

OTHER PUBLICATIONS

Structured Computer Organization Third edition, Andrew S Tanenbaum 1990 pp. 11-13.*

*Primary Examiner* — Paul R Myers (74) *Attorney, Agent, or Firm* — Harrington & Smith (57) ABSTRACT

An apparatus includes a hardware unit having an interface to a clock generator, an interface to a power supply and an interface to a software unit. The interface to the software unit is configurable to receive a request from the software unit that identifies at least one operating point for the apparatus. The hardware unit is operable to control at least one of the clock generator and the power supply so as to achieve the requested operating point.

24 Claims, 10 Drawing Sheets

U.S. PATENT DOCUMENTS

| | | | |
|---|---|---|---|
| 7,802,116 B2 * | 9/2010 | Ravichandran | 713/320 |
| 2002/0133241 A1 * | 9/2002 | Takahashi et al. | 700/22 |
| 2003/0226050 A1 * | 12/2003 | Yik et al. | 713/324 |
| 2004/0128577 A1 * | 7/2004 | Silvester | 713/324 |
| 2004/0193929 A1 * | 9/2004 | Kuranuki | 713/322 |
| 2004/0199799 A1 * | 10/2004 | Flynn | 713/300 |
| 2004/0268171 A1 * | 12/2004 | Inoue et al. | 713/323 |
| 2006/0026447 A1 | 2/2006 | Naveh et al. | 713/322 |
| 2006/0149975 A1 * | 7/2006 | Rotem et al. | 713/300 |
| 2007/0150765 A1 * | 6/2007 | Ochiai | 713/300 |
| 2008/0141047 A1 * | 6/2008 | Riviere-Cazaux | 713/300 |
| 2009/0144578 A1 * | 6/2009 | Tatsumi | 713/340 |

* cited by examiner

| CONTROL INTERFACE | | | |
|---|---|---|---|
| NAME | STATES | DEFAULT STATE | FUNCTION |
| OPT 1, PSS 1 PERFORMANCE REQUEST | 0...10 | 5 | REQUEST PERFORMANCE FOR THE PSS 1 |
| OPT 2, PSS 1 OPERATING POINT REQUEST | 0...5 | 3 | REQUEST OPERATING POINT FOR THE PSS 1 |
| PSS 1 PROCESSING INTERVAL | 0...MAX | MAX | TIME in_sec |

FIG.3

| STATUS INTERFACE | | | |
|---|---|---|---|
| NAME | STATES | DEFAULT STATE | FUNCTION |
| OPT 1, PSS 1 PRESENT PERFORMANCE LEVEL | 0...10 | 5 | INFORMS SW WHAT IS THE PERFORMANCE LEVEL CURRENTLY AVAILABLE |
| OPT 1, PSS 1 TARGET PERFORMANCE LEVEL | 0...10 | 5 | INFORMS SW WHAT IS THE PERFORMANCE LEVEL UNDER TARGET |
| OPT 2, PSS 1 PRESENT OPERATING POINT | 0...5 | 3 | INFORMS SW WHAT IS THE OPERATING POINT CURRENTLY AVAILABLE |
| OPT 2, PSS 1 TARGET OPERATING POINT | 0...5 | 3 | INFORMS SW WHAT IS THE OPERATING POINT UNDER TARGET |

FIG.4

| CONFIGURATION INTERFACE | | | |
|---|---|---|---|
| NAME | STATES | DEFAULT STATE | FUNCTION |
| OPERATING POINT 0 FREQUENCY | | | SETS THE FREQUENCY FOR OP 0 |
| OPERATING POINT 1 FREQUENCY | | | SETS THE FREQUENCY FOR OP 1 |
| OPERATING POINT 2 FREQUENCY | | | SETS THE FREQUENCY FOR OP 2 |
| OPERATING POINT 3 FREQUENCY | | | SETS THE FREQUENCY FOR OP 3 |
| OPERATING POINT 4 FREQUENCY | | | SETS THE FREQUENCY FOR OP 4 |
| OPERATING POINT 5 FREQUENCY | | | SETS THE FREQUENCY FOR OP 5 |
| ... | | | |
| 0=SW CONTROLLED OP HANDLING 1=HW CONTROLLED OP HANDLING* | 0...1 | | SELECTS THE HW OR SW BASED OP HANDLING |

*DFS OPTION #1

FIG.5A

| CONFIGURATION INTERFACE | | | |
|---|---|---|---|
| NAME | STATES | DEFAULT STATE | FUNCTION |
| OPERATING POINT 0 VOLTAGE | | | SETS THE VOLTAGE FOR OP 0 |
| OPERATING POINT 1 VOLTAGE | | | SETS THE VOLTAGE FOR OP 1 |
| OPERATING POINT 2 VOLTAGE | | | SETS THE VOLTAGE FOR OP 2 |
| OPERATING POINT 3 VOLTAGE | | | SETS THE VOLTAGE FOR OP 3 |
| OPERATING POINT 4 VOLTAGE | | | SETS THE VOLTAGE FOR OP 4 |
| OPERATING POINT 5 VOLTAGE | | | SETS THE VOLTAGE FOR OP 5 |
| ... | | | |
| 0=SW CONTROLLED OP HANDLING 1=HW CONTROLLED OP HANDLING* | 0...1 | | SELECTS THE HW OR SW BASED OP HANDLING |

*DFS OPTION #1

RUNTIME CONTROL OF SYSTEM PERFORMANCE

TECHNICAL FIELD

The exemplary and non-limiting embodiments of this invention relate generally to energy/power management and system control methods and apparatus and, more specifically, relate to techniques to control system performance and to achieve power management when the system is implemented in an integrated circuit format, such as in an ASIC.

BACKGROUND

Various abbreviations that appear in the specification and/or in the drawing figures are defined as follows:
DFS dynamic frequency scaling
DVS dynamic voltage scaling
DVFS dynamic voltage and frequency scaling
HW hardware
OP operating point
PM power management
PPD peripheral power domain
PSS processor subsystem
SC system control
SW software The OP may be considered as some particular functional performance point for a system or subsystem, and may be considered to represent a combination of clock frequencies and operating voltages that are in use.

In some current ASIC design architectures the various subsystem and/or system performance control methods are embodied in SW layers, while the HW simply provides a mechanism to control the system performance in frequency, i.e., clock frequency, and voltage. For example, to achieve frequency and voltage control the SW may be responsible for determining a level of desired performance and for mapping the determined level of system performance into different subsystem performance states. The result of this processing by the SW is then passed to the HW to effect the indicated changes in the clock frequency and/or power supply output voltage levels.

It should be noted that the frequency and/or voltage control function may need to be accomplished during runtime, and thus should ideally be accomplished with minimal latency. However, this may be difficult to accomplish if the system SW is engaged in other runtime-related tasks.

WO 2005/050425 A1 describes a device for regulating a voltage supply to a semiconductor device. The device has memory for storing a plurality of performance ranges, where respective performance ranges are associated with a respective supply voltage. The device also includes a measurement unit for measuring the performance of the semiconductor device and a regulator for modifying the supply voltage to the semiconductor device if the measured performance of the semiconductor device is not within a predetermined portion of the performance range associated with the voltage supplied to the semiconductor device. A set of reference circuit count values is stored in a look-up table, where each set of reference circuit count values is associated with a respective supply voltage.

What is needed is a technique to enable accurate, simple and low latency control of frequency and voltage in an integrated circuit environment.

SUMMARY OF THE EXEMPLARY EMBODIMENTS

The foregoing and other problems are overcome, and other advantages are realized, in accordance with the non-limiting and exemplary embodiments of this invention.

In a first aspect thereof the exemplary embodiments of this invention provide a method that comprises, receiving a request from a software unit that identifies at least one operating point for a subsystem of an integrated circuit; and in response to the received request, controlling at least one of a clock generator and a power supply of the integrated circuit so as to achieve the requested operating point.

In another aspect thereof the exemplary embodiments of this invention provide a computer-readable memory that stores computer program instructions, execution of which result in performance of operations that comprise, in response to receiving at a hardware unit a request from a software unit that identifies at least one operating point for a subsystem of an integrated circuit, controlling at least one of a clock generator and a power supply of the integrated circuit so as to achieve the requested operating point; and sending a status indication to the software unit to indicate at least when the requested operating point has been established.

In another aspect thereof the exemplary embodiments of this invention provide an apparatus that includes a hardware unit having an interface to a clock generator, an interface to a power supply and an interface to a software unit. The interface to the software unit is configurable to receive a request from the software unit that identifies at least one operating point of a subsystem of the apparatus. The hardware unit is operable to control at least one of the clock generator and the power supply so as to achieve the requested operating point.

In a further aspect thereof the exemplary embodiments of this invention provide an apparatus that comprises means for receiving a request from a software unit that identifies at least one operating point for a subsystem of an integrated circuit; means, responsive to the received request, for controlling at least one of a clock generator and a power supply of the integrated circuit so as to achieve the requested operating point; and means for sending a status indication to the software unit to indicate at least when the requested operating point has been established, where a requested performance, voltage, frequency or a combination of these may be indicated by the status.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

The exemplary embodiments of this invention provide enhanced energy/power management and system control, as well as overall power consumption optimization for use in, for example, an embedded system (HW and SW), such as an ASIC. The exemplary embodiments of this invention provide methods and apparatus to partition the HW and SW to implement a dynamic voltage and frequency scaling feature. The use of the exemplary embodiments of this invention enables more optimal HW and SW partitioning for a variety of data processor, system and subsystem embodiments wherein processing performance scaling is desirable. The phrase "more optimal" in this context implies at least a facilitation of HW and SW integration and enhanced and straightforward runtime performance control. In general, overall system performance, in at least a power efficiency sense, is improved by providing a more efficient method for controlling subsystem performance, without sacrificing overall configurability and the flexibility of subsystem performance control.

Figure 1:
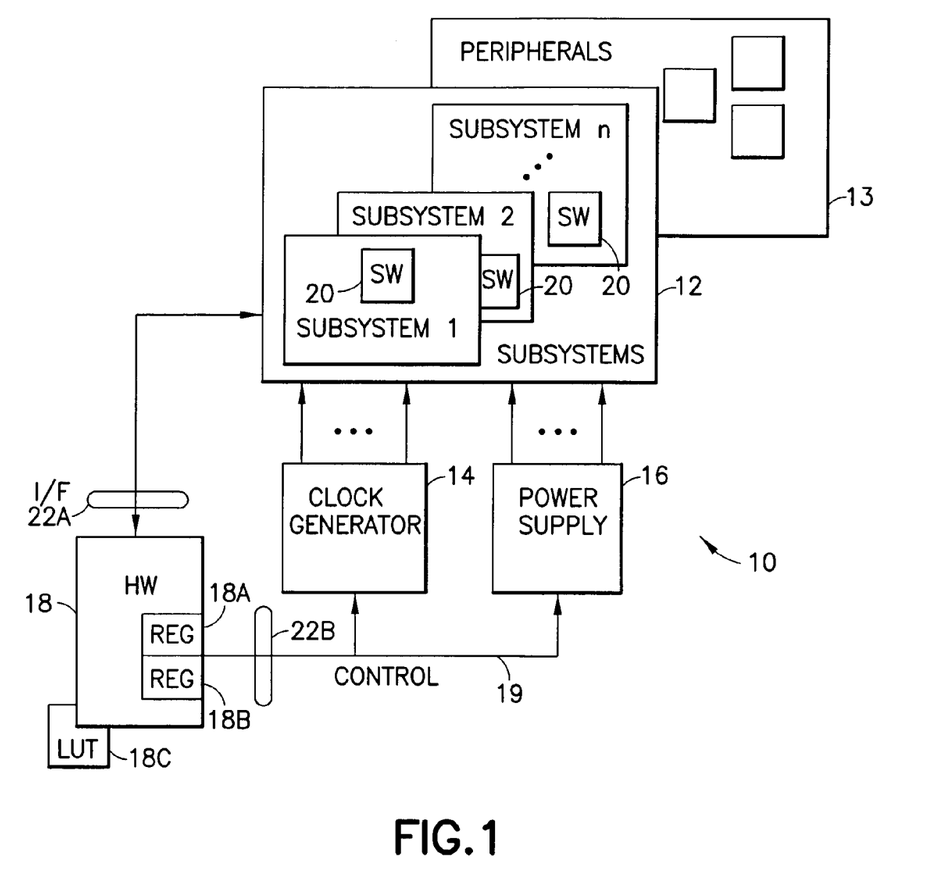
FIG. 1 is a simplified high level block diagram of an integrated circuit that is constructed and operated in accordance with the exemplary embodiments of this invention.

FIG. 1 is a simplified high level block diagram of an integrated circuit (IC) 10, which may be embodied in an ASIC, that is constructed and operated in accordance with the exemplary embodiments of this invention. The IC 10 includes a plurality of subsystems 12 which can take any suitable form depending on the purpose and overall functionality of the IC 10. As one non-limiting example, and assuming that the IC 10 is intended for use in a communications device such as a cellular phone, the various subsystems 12 (subsystem$_1$, subsystem$_2$, ..., subsystem$_n$) may implement radio frequency reception and demodulation functions, radio frequency modulation and transmission functions, and/or baseband functions such as encoding, decoding, analog to digital conversion and digital to analog conversion. Each subsystem 12 may embody a separate processor subsystem, and each processor subsystem may have associated SW 20 (collectively referred to below as the SW 20). The IC 10 may also include a plurality of peripheral units 13. The peripheral units 13 may embody interfaces to other systems, such as a camera, a display, a USB port, and/or they may embody independent modules that may comprise computing algorithms and memories, as non-limiting examples. Note that each subsystem may access a plurality of the peripheral units 13, and each subsystem 12 may access the same peripheral units 13. The subsystems 12 and peripheral units 13 are assumed to be supplied with suitable clock signals and power supply operating (and possibly bias) voltages from a clock generator 14 and a power supply 16, respectively. In practice, there may be a plurality of clock generators 14 and a plurality of power supplies 16 present, and the use of the exemplary embodiments is compatible with providing control over multiple clock generators and multiple power supplies. Thus, any subsequent references herein to the clock generator 14 and to the power supply 16 should not be viewed as limiting the numbers of these units that may be present. An IC HW block 18 is coupled via a control bus 19 to the clock generator 14 and to the power supply 16 for exerting overall control over clock frequencies and power supply voltage levels, in accordance with the exemplary embodiments of this invention. In practice separate control buses may be used between the HW block 18 and the clock generator 14 and the power supply 16. A plurality of interfaces (I/Fs) 22A, 22B are assumed to be present, such as an I/F 22A between the SW/subsystems/peripherals 12, 13 and the HW block 18. The control bus 19 may also be assumed to be associated with an I/F 22B.

The SW block(s) or unit(s) 20 may include appropriate operating software for the respective subsystem 12. In some situations it may be desirable that the HW 12-SW 20 is operating system (OS)-independent.

Figure 2:
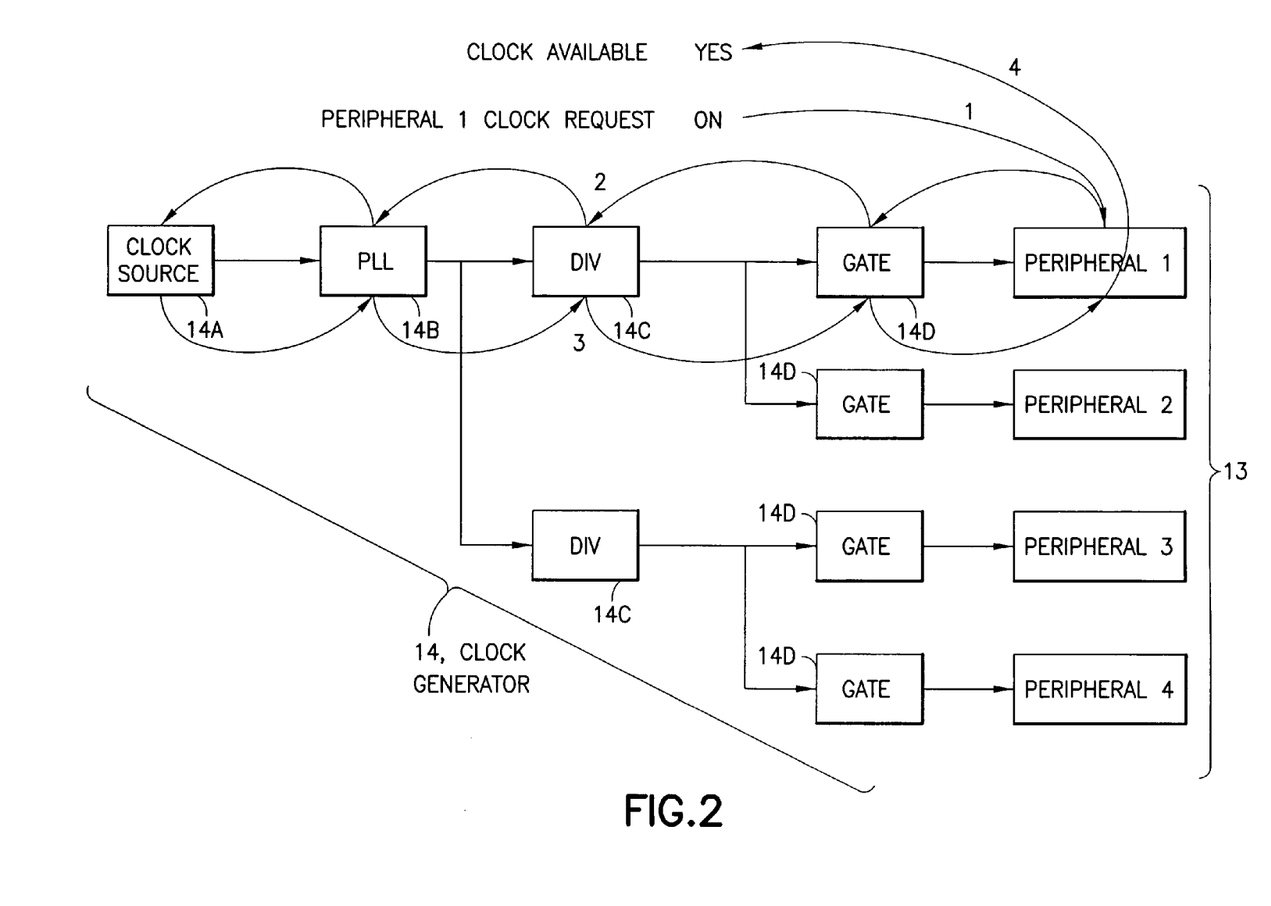
FIG. 2 is an example of peripheral clock request handling in HW.

In general, a PSS subsystem clock domain control I/F contains basically the HW register(s) 18A containing clock generator 14 phase lock loop (PLL) setup, clock divider and clock source selection bits (e.g., see also FIG. 2). In a similar manner, at least one HW register 18B stores bits for accomplishing control over the power supply 16.

It should be noted that the HW block 18 may be implemented solely as HW components such as registers, logic gates, state machines and the like, or it may be implemented solely as a microcontrol unit that operates using a program stored in a local (e.g., on-chip) memory (firmware), or it may be implemented as a combination of HW components and firmware.

In the exemplary embodiments of this invention the configurability (non-runtime control of the system 10) may be implemented by the SW 20, while the runtime control is handled in the HW 18.

Described below are details for the HW-SW interface 22A and the functional partitioning between the HW 18 and the system SW 20, and the use of the control bus 19 interface 22C by the HW block 18. As will be apparent, the use of these embodiments enhances the overall runtime performance of the system 10 (e.g., enhances the processing performance and power efficiency), while decreasing the HW and SW integration time and resource needs.

In general, in first embodiments of voltage management and frequency management (also referred to as option 1) the actual voltage/clock domain partitioning is hidden from the SW 20, and the SW 20 is responsible only for providing general control instructions to the HW 18, such as a request to change one or both of the voltage/frequency settings, or to request that voltages/clocks be turned on based on the needs of the SW 20. In second embodiments of voltage management and frequency management (also referred to as option 2) the SW 20 need not request voltage/frequency at all when starting to use a certain subsystem 12 (or peripheral). Instead, a first access to the particular subsystem/peripheral may automatically generate a voltage/clock request to the HW 18 which responds by automatically turning on the required voltage/clock. Subsequently turning off the voltages/clocks may also be accomplished in an automatic fashion, such as by expiration of a HW timer that is set to expire at some time t after a last SW access to the subsystem/peripheral. The value of t may be fixed, or it may be programmable and settable based on configuration information (latency requirement time) received at the HW block 18 via the I/F 22A.

FIG. 2 presents a non-limiting example of peripheral 13 clock request handling by the HW 18. The clock generator 14 is assumed to include a clock source 14A (e.g., a crystal oscillator (XO)), a PLL 14B, a plurality of programmable dividers (DIV) 14C and a plurality of gates 14D for gating on and off generated clock signals to individual ones of the peripherals 13. A feature of this embodiment is that the SW 20 does not need to have knowledge of the clock chain at all, instead it simply requests a clock for a certain HW peripheral 13 that the SW 20 needs to use, and the HW 18 handles the actual setup and control of the clock generation. For example, the SW 20 turns on a request bit for peripheral 1 (step 1) and this request propagates through the clock chain (step 2) in the system ASIC and baseband modules without SW interaction. The SW 20 then waits for an indication (e.g., such as by polling a status bit, or by receiving an interrupt) that the clock is available at the peripheral device (steps 3 and 4).

Note that the clock request chain is presented as it is in FIG. 2 simply to emphasize that in this topology the clock request goes only to a next level of clock control in the chain in order to make the clock gating as efficient as possible. For example, the divider 14C may have internal clock gating which is controlled by all clock branches that originate at the divider. Similarly, the PLL 14B may handle PLL startup and shutdown based on requests made for it. The PLL 14B may also ensure that acknowledge signaling back towards the requestor(s) is given only when the PLL 14B is locked and stable. The same applies for control of the clock source 14A. This may imply the use of an XO settling time counter or similar type of mechanism to indicate when the XO is stable.

In order to provide additional enhancements for the peripheral clock control there may be a clock request interval time also provided for the HW 18. In this case the HW 18 may combine all such intervals together and select a smallest interval value for use in the PLL 14B and clock source 14A control. The PLL 14B and clock source 14A may have programmable settling time values which in effect set limits for PLL and clock source shutdown in the HW 18. Alternatively, this can be handled by the SW 20.

In a first embodiment of runtime DFS control, the dynamic frequency scaling process assumes that the SW 20 handles in a centralized manner a determination of a need to change the PSS performance, while the HW 18 is responsible for the actual control operations to make the PSS performance change. In practice this may imply that the SW 20 simply informs the HW 18 of what system performance is needed in a range of, for example, 0 to 100.

As one example, the HW-SW interface 22A may support three states for accomplishing the PSS performance control from the SW 20 perspective with regard to clock management. The first state (0) indicates SW 20 controlled clock tree handling, the second state (1) indicates HW 18 controlled clock tree handling, and the third state (2) indicates HW 18 controlled clock request and clock tree handling.

Figure 3:
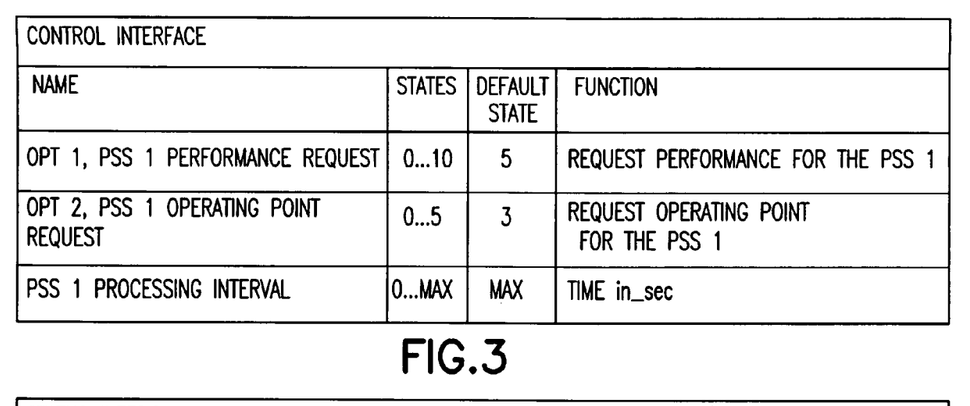
FIG. 3 depicts an exemplary control interface.
Figure 4:
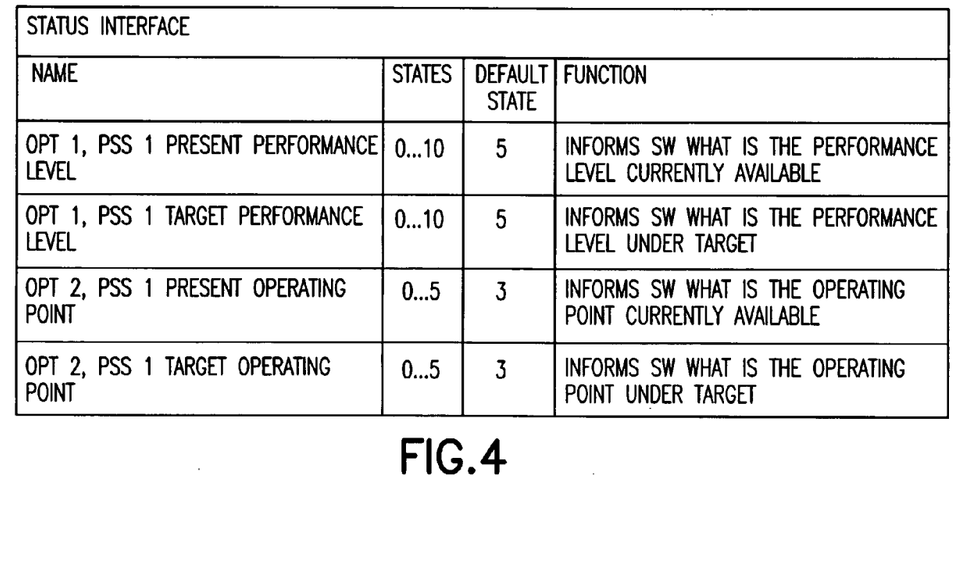
FIG. 4 depicts an exemplary status interface.
Figure 5A:
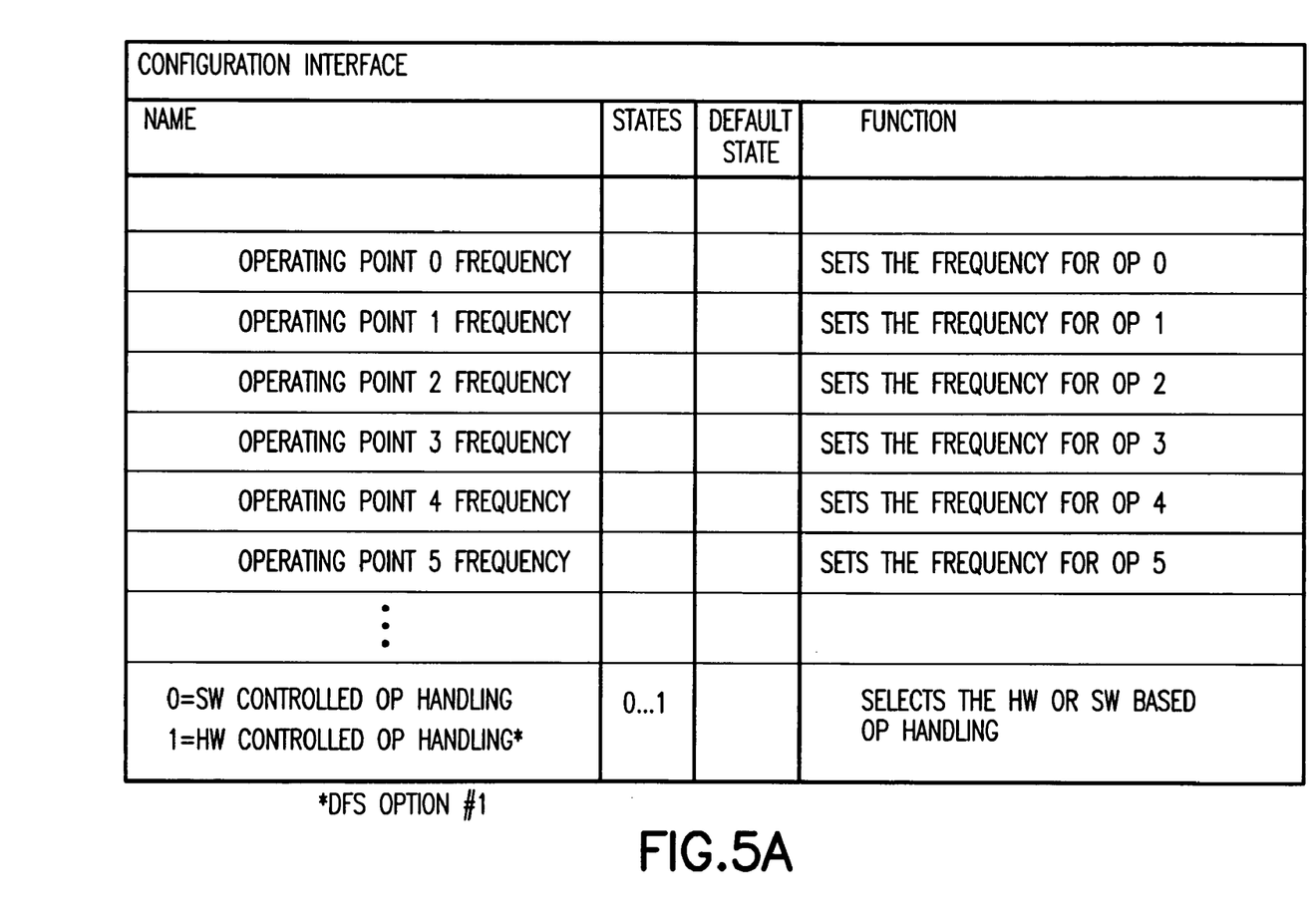
FIG. 5A depicts an exemplary clock configuration interface and FIG. 5B depicts an exemplary voltage configuration interface that together form a part of a HW/SW interface shown in FIG. 1.
Figure 5B:
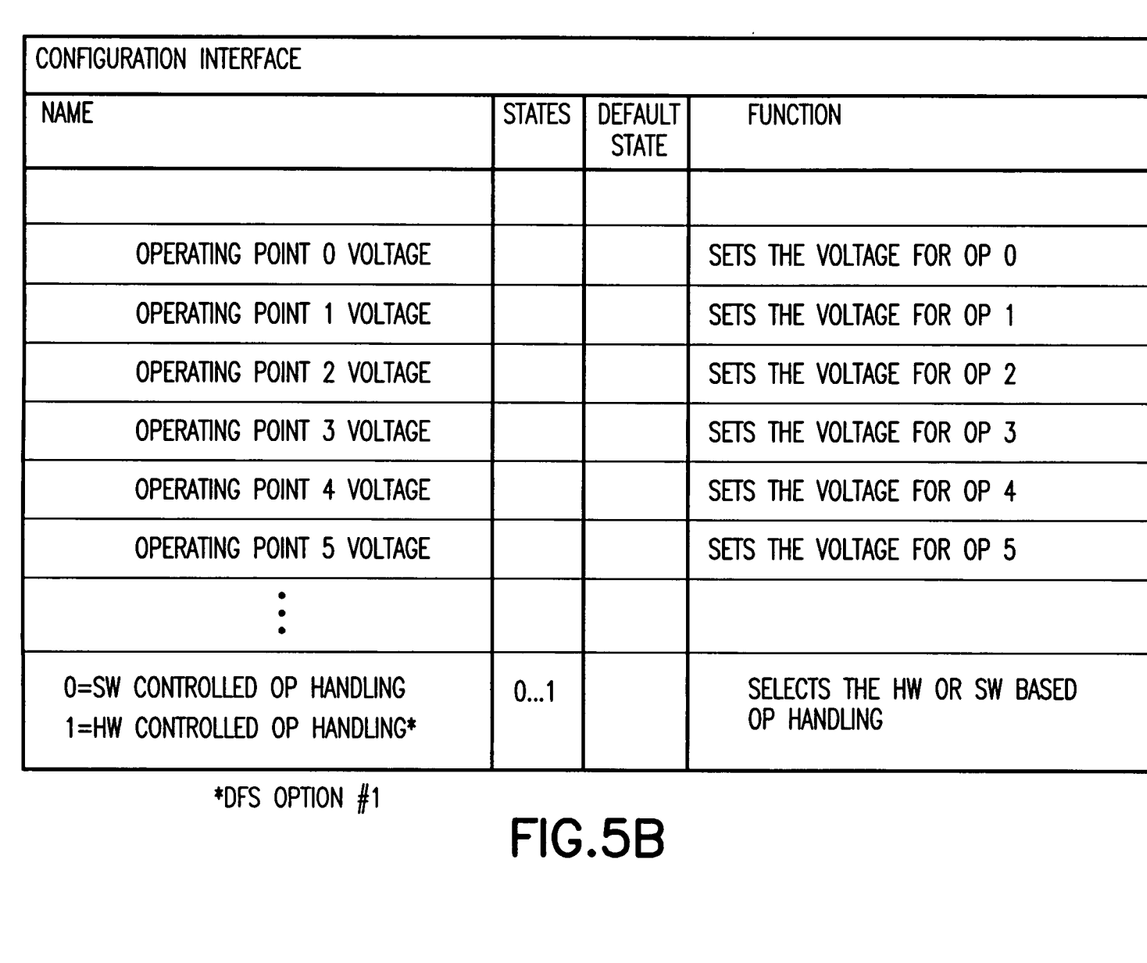

FIG. 3 depicts an exemplary control interface, FIG. 4 depicts an exemplary status interface, FIG. 5A depicts an exemplary clock configuration interface and FIG. 5B depicts an exemplary voltage configuration interface that together form a part of the HW/SW I/F 22A for a first runtime DFS option. The selection between SW or HW controlled OP handling is done from the configuration interface (SW controlled OP handling=Option #2, HW controlled OP handling=Option #1). The configuration interfaces depicted in FIGS. 5A and 5B are valid for both Option #1 and Option #2. In these Figures any listed State ranges and Default State should be considered exemplary and non-limiting. In FIG. 3 the SW 20 instructs the HW 18 of the PSS performance request and operating point, and provides a processing interval. In FIG. 4 the HW 18 indicates to the SW 20 the currently available performance level, the target performance level, the currently available operating point and the target operating point.

Figures 6A, 6A:
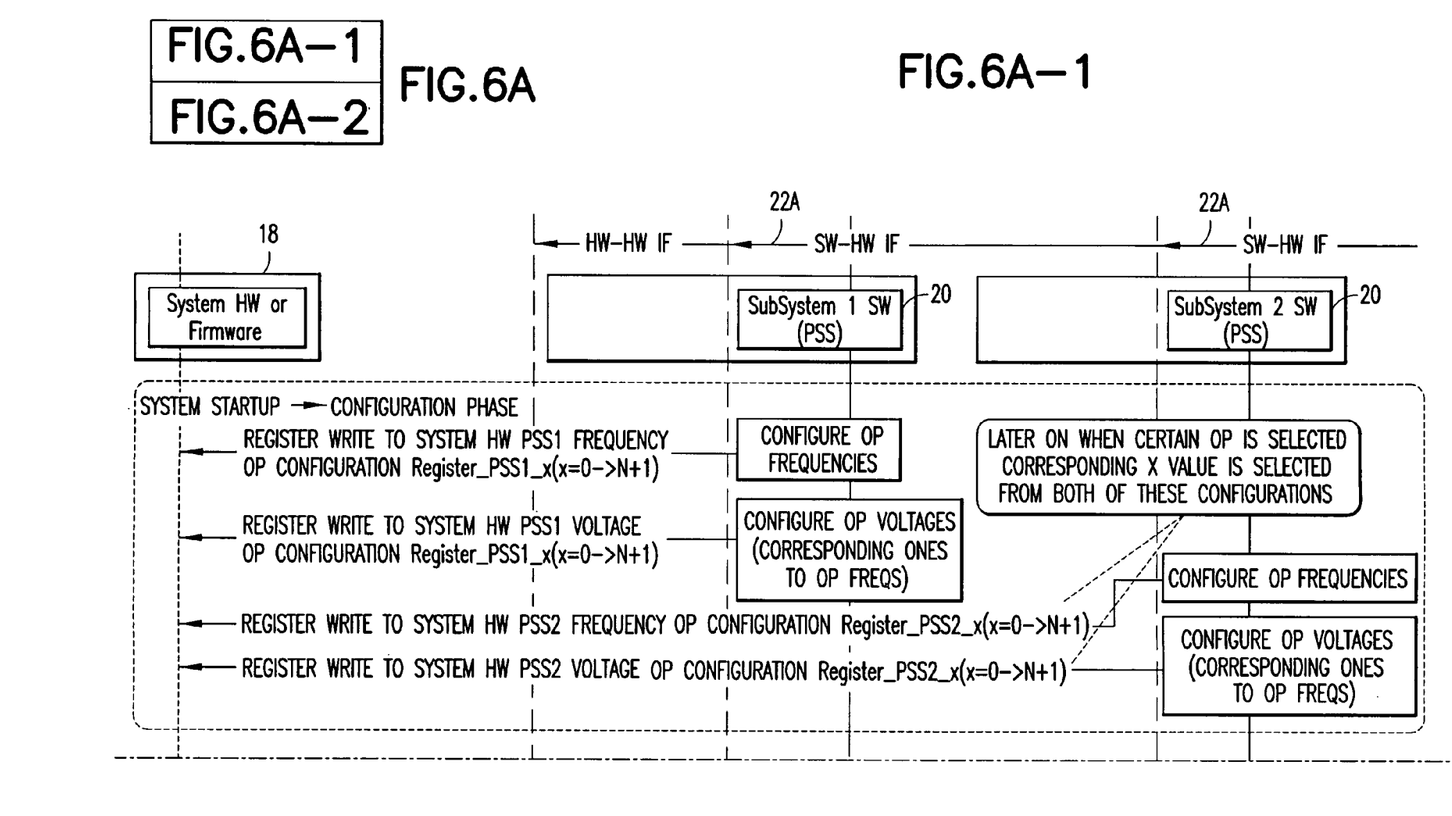
FIGS. 6A and 6B, collectively referred to as FIG. 6, depict process flow between the system HW and two exemplary subsystem SW units shown in FIG. 1.
Figure 6A:
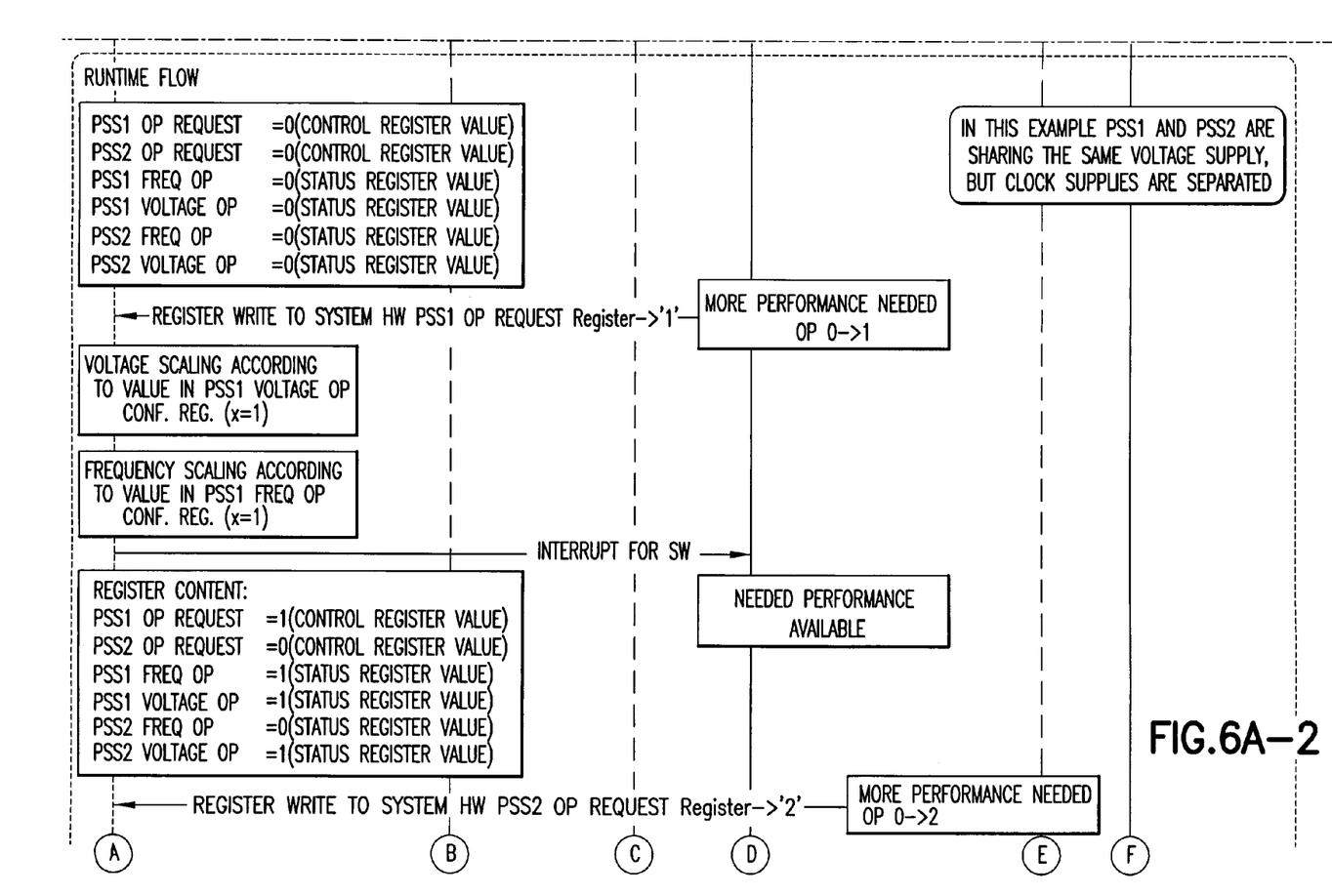
Figures 6B, 6B:
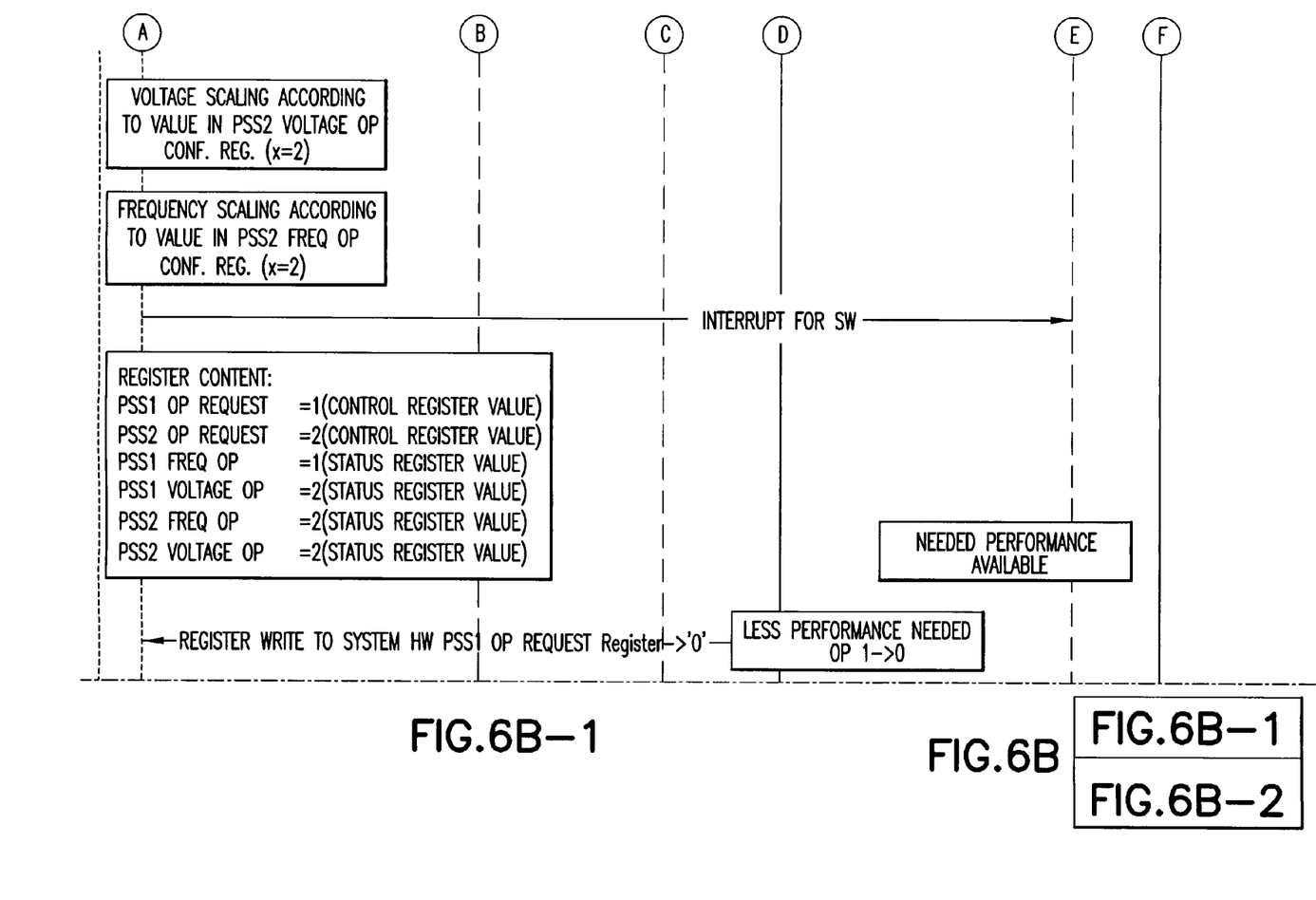
Figure 6B:
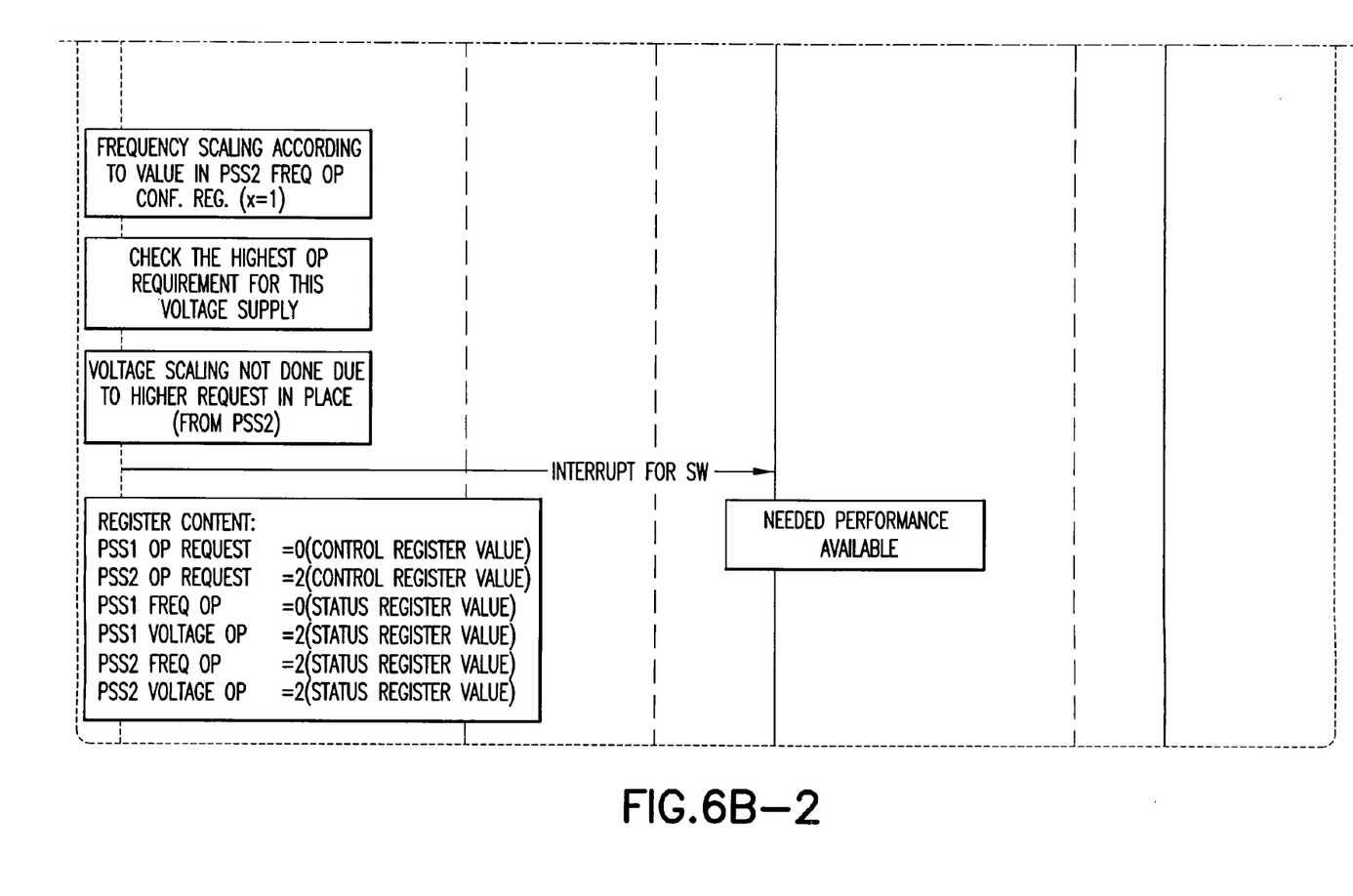

FIGS. 6A and 6B, collectively referred to as FIG. 6, depict process flow between the system HW 18 and two exemplary subsystem 12 SW units 20 shown in FIG. 1 (also referred to here as PSS1 and PSS2). FIG. 6 is useful in gaining a greater understanding of FIGS. 3, 4, 5A and 5B.

FIG. 6 depicts the operation of the system 10 during a system startup (configuration phase) and then during system runtime flow. During the startup phase each SW unit 20 makes a write to a respective (PSS1, PSS2) frequency operation parameter (OP) register and voltage OP configuration register to configure respective clock(s) and the corresponding voltage(s). In the illustrated example it is assumed the PSS1 and PSS2 share the same power supply 16 voltage supply, but use separate clocks.

At runtime the HW 18 initializes corresponding PSS1 and PSS2 OP requests and frequency and voltage status registers. The subsequent blocks show PSS1 and PSS2 both making a request to the HW 18 for more performance by making a write to corresponding system HW PSS1 (PSS2) OP request registers, and the response of the HW 18 by performing voltage scaling and frequency scaling according to the values previously stored during the configuration phase in the respective PSS1 and PSS2 configuration registers. The HW 18 initiates an interrupt to the SW 20 when the requested performance is available (e.g., after the required settling times of the power supply 16 and/or clock generator 14).

Note that FIG. 6B also shows a request made by PSS1 for a reduction in performance. In response the HW 18 performs the scaling of the associated clock, and checks the highest requested operating point requirement for the voltage supply (power supply 16). In this case the HW 18 determines that the voltage scaling (reduction) should not be performed, as it would result in a voltage less than the voltage needed to support the operating performance previously requested for this same voltage supply by PSS2. The HW 18 then initiates an interrupt to the SW 20 of PSS1 when the requested (reduction in) performance is available.

With regard to the SW-HW interactions and sequences, a basic principle is to hide the actual clock frequency control from the SW 20. Preferably, the SW 20 simply instructs the HW 18 of the processing power requirement(s) and the HW 18 handles then the actual clock frequency control. As a requested performance level may not be available immediately (e.g., due to some HW dependency or voltage control requirement), a mechanism is also provided to inform the SW 20 when the targeted performance level has been achieved. This may be accomplished by generating a dedicated interrupt for the SW 20, or by setting an appropriate status bit that can be periodically polled by the SW 20. A goal of this procedure is to make the runtime control of the system of the IC 10 as simple as possible from the SW 20 perspective.

The second option referred to (Option #2) also moves the performance reasoning (performance logic or algorithm) into the HW 18. In this case there need not be any runtime type of interface control provided for the SW 20.

Note, however, that the configuration of the HW 18 may still be performed if desired by the SW 20.

As another example, the HW-SW interface 22A may support three states for accomplishing the PSS performance control from the SW 20 perspective with regard to operating point (OP) management. The first state (0) indicates SW 20 OP handling, the second state (1) indicates partial HW 18 controlled OP handling (Option #1), and the third state (2) indicates full HW 18 controlled OP handling (Option #2).

Figure 7:
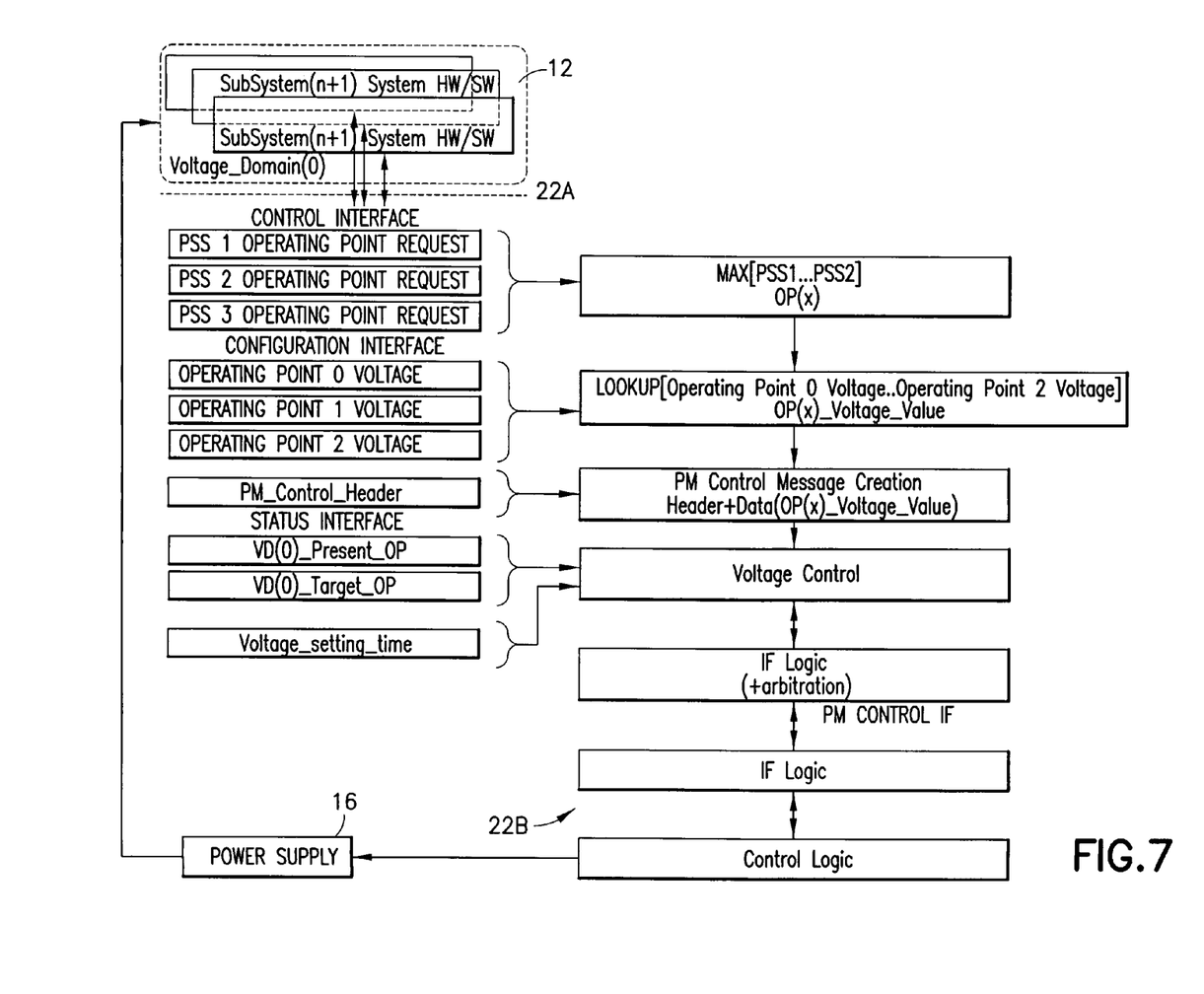
FIG. 7 is a block diagram that illustrates the operation of the system HW in accordance with the exemplary embodiments of this invention.

Discussed now are SW-HW interactions and sequences with respect to FIG. 7. The discussion assumes that the operating point definition option (Option #2) for the HW-SW interface is used. In this example the HW 18 collects predefined (SW 20 configured) operating point requests together from several processor subsystems 12 that reside in the common voltage domain.

The PSS SW 20 selects a required operating point based on need by using the operating point request HW interface. The HW 18 collects all of the processor subsystem 12 requests (Step 1) and selects a maximum operating point (Step 2). This step can be accomplished using a lookup table (LUT) 18C shown in FIG. 1. The HW 18 then fetches the predefined voltage value from the configuration IF for the selected operating point. This voltage value is then combined as data with a predefined PM IF header (Step 3) which is then delivered through the control bus 19 to the power supply 16 (steps 4, 5, 6 and 7). The HW 18 may, for example, use a SW programmable timer for voltage settling time if the power supply 16 and the PM IF bus do not provide this information. After the voltage settling time has expired the HW 18 informs the SW 20 using the status IF that the OP has changed (Step 4), and thus informs the SW 20 that it may continue and use the new operating point.

Note that the various blocks shown in FIG. 7 may be viewed as method steps, and/or as operations that result from operation of computer program code, and/or as a plurality of coupled logic circuit elements constructed to carry out the associated function(s).

As was noted above, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. As but one example, the use of other similar or equivalent fields in the various interface messaging shown in FIGS. 3-8 may be attempted by those skilled in the art. However, all such and similar modifications of the teachings of this invention will still fall within the scope of this invention.

Further, it should be appreciated that the exemplary embodiments of this invention are not limited for use with any one particular type of wireless communication system, and that they may be used to advantage in many different types of wireless communication systems, such as when embodied in apparatus used in wireless communication handsets. It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
    receiving a request originated by a software unit, wherein the software unit implements non-runtime control of a system embodied in an integrated circuit, and wherein the request is received at a hardware unit implementing runtime control of the system, the received request identifying at least one operating point for a subsystem of the integrated circuit, the operating point being chosen from among a plurality of operating points, at least two of which represent non-idle, non-sleep performance levels differing from one another; and
    in response to the received request, determining clock and power characteristics that will achieve the requested operating point and controlling at least one of a clock generator and a power supply of the integrated circuit so as to achieve the requested operating point, where
    said integrated circuit comprises a plurality of subsystems, and where the received request is automatically generated in response to the software unit, when starting to use a particular subsystem, making a first access to the particular subsystem.

2. The method of claim 1, where controlling comprises sending a status indication to the software unit to indicate at least when the requested operating point has been established.

3. The method of claim 1, where controlling comprises sending a status indication to the software unit to indicate whether at least one of a requested performance, voltage and frequency is above or below a target value.

4. The method of claim 1, where controlling comprises performing a table lookup using information related to the requested operating point to retrieve control information for inclusion in a control message that is sent by the hardware unit to at least one of the clock generator and the power supply.

5. The method of claim 1, where the request is received through an interface between the hardware unit and the software unit.

6. The method of claim 1, where the integrated circuit further comprises a plurality of peripheral units, and where another received request is automatically generated in response to the software unit, when starting to use a particular peripheral unit, making a first access to the particular peripheral unit.

7. The method of claim 1, where the integrated circuit is installed within a wireless communication apparatus.

8. The method of claim 7, where one of the plurality of subsystems comprises radio frequency functions, and another one of the plurality of subsystems comprises baseband functions.

9. The method of claim 1, where controlling at least one of the clock generator and the power supply of the integrated circuit so as to achieve the requested operating point comprises controlling at least one of the clock generator to output a specified clock signal to the particular subsystem and the power supply to output a specified voltage to the particular subsystem, and further comprising automatically controlling at least one of the clock generator and the power supply of the integrated circuit to turn off the specified clock signal and voltage in response to expiration of a timer set to expire at some time t after a last access by the software unit to the particular subsystem.

10. A computer-readable memory that stores computer program instructions, execution of which result in performance of operations that comprise:
   in response to receiving a request originated by a software unit, wherein the software unit implements non-runtime control of a system embodied in an integrated circuit, and wherein the request is received at a hardware unit implementing runtime control of the system, the received request identifying at least one operating point for a subsystem of the integrated circuit, the operating point being chosen from among a plurality of operating points, at least two of which represent non-idle, non-sleep performance levels differing from one another, determining clock and power characteristics that will achieve the requested operating point and controlling at least one of a clock generator and a power supply of the integrated circuit so as to achieve the requested operating point; and
   sending a status indication to the software unit to indicate at least when the requested operating point has been established or if an achieved performance, voltage and/or frequency is less than a target value, where
   the integrated circuit comprises a plurality of subsystems, and where the received request is automatically generated in response to the software unit, when starting to use a particular subsystem, making a first access to the particular subsystem.

11. The memory of claim 10, where controlling comprises performing a table lookup using information related to the requested operating point to retrieve control information for inclusion in a control message that is sent by the hardware unit to at least one of the clock generator and the power supply.

12. The memory of claim 10, where the request is received through an interface between the hardware unit and the software unit.

13. The memory of claim 10, where the integrated circuit further comprises a plurality of peripheral units, and where another received request is automatically generated in response to the software unit, when starting to use a particular peripheral unit, making a first access to the particular peripheral unit.

14. The memory of claim 10, where the integrated circuit is installed within a wireless communication apparatus.

15. An apparatus, comprising a hardware unit configured to implement runtime control of a system, wherein the hardware unit has an interface to a clock generator, an interface to a power supply and an interface to a software unit configured to implement non-runtime control of the system, wherein the interface to the hardware unit is configurable to receive a request that is originated by the software unit and that identifies at least one operating point of a subsystem of the apparatus, the operating point being chosen from among a plurality of operating points, at least two of which represent non-idle, non-sleep performance levels differing from one another, the performance and power consumption provided by the respective operating points differing between the operating points, hardware unit configurable to determine clock and power characteristics that will achieve the requested operating point and control at least one of the clock generator and the power supply so as to achieve the requested operating point, where said apparatus comprises an integrated circuit embodying the system and wherein the system comprises a plurality of subsystems, and where the received request is automatically generated in response to the software unit, when starting to use a particular subsystem, making a first access to the particular subsystem.

16. The apparatus of claim 15, where said hardware unit is further configurable to send a status indication to the software unit to indicate at least when the requested operating point has been established or to indicate whether at least one of a requested performance, voltage and frequency is above or below a target.

17. The apparatus of claim 15, where said hardware unit performs a table lookup using information related to the requested operating point to retrieve control information for inclusion in a control message that is sent by the hardware unit to at least one of the clock generator and the power supply through the associated interface.

18. The apparatus of claim 15, where said integrated circuit further comprises a plurality of peripheral units, and where another received request is automatically generated in response to the software unit first accessing one of the peripheral units.

19. The apparatus of claim 15, where said integrated circuit is installed within a wireless communication apparatus, and where one of the plurality of subsystems comprises radio frequency functions, and another one of the plurality of subsystems comprises baseband functions.

20. The apparatus of claim 15, where said hardware unit when controlling at least one of the clock generator and the power supply of the integrated circuit so as to achieve the requested operating point is configured to control at least one of the clock generator to output a specified clock signal to the particular subsystem and the power supply to output a specified voltage to the particular subsystem, said hardware unit being further configurable to automatically control at least one of the clock generator and the power supply of the integrated circuit to turn off the specified clock signal and voltage in response to expiration of a timer set to expire at some time t after a last access by the software unit to the particular subsystem.

21. An apparatus, comprising:
   means for receiving at a hardware unit configured to implement runtime control of a system, wherein the hardware unit is further configured to receive a request from a software unit configured to implement non-runtime control of the system, wherein the request identifies at least one operating point for a subsystem of an integrated circuit, the operating point being chosen from among a plurality of operating points, at least two of which represent non-idle, non-sleep performance levels differing from one another;
   means, responsive to the received request, for determining clock and power characteristics that will achieve the requested operating point and controlling at least one of a clock generator and a power supply of the integrated circuit so as to achieve the requested operating point; and
   means for sending a status indication to the software unit to indicate at least when the requested operating point has been established or to indicate whether a requested performance, voltage and/or frequency is above or below a target, where said integrated circuit comprises a plurality of subsystems, and where the received request is automatically generated in response to the software unit, when starting to use a particular subsystem, making a first access to the particular subsystem.

22. The apparatus of claim 21, where said controlling means comprises a lookup table that is addressed using information related to the requested operating point to retrieve control information for inclusion in a control message that is sent to at least one of the clock generator and the power supply.

23. The apparatus of claim 21, where the integrated circuit further comprises a plurality of peripheral units, and where another received request is automatically generated in response to the software unit, when starting to use a particular peripheral unit, making a first access to the particular peripheral unit.

24. The apparatus of claim 21, where the integrated circuit is installed within a wireless communication apparatus, and where one of the plurality of subsystems comprises radio frequency functions, and another one of the plurality of subsystems comprises baseband functions.

* * * * *